(12) United States Patent
Cheong et al.

(10) Patent No.: US 10,342,011 B2
(45) Date of Patent: *Jul. 2, 2019

(54) METHOD AND DEVICE FOR ALLOCATING RESOURCE IN WIRELESS LAN SYSTEM, COMMUNICATION TERMINAL METHOD AND COMMUNICATION TERMINAL

(71) Applicant: ELECTRONICS AND TELECOMMUNICATIONS RESEARCH INSTITUTE, Daejeon (KR)

(72) Inventors: Min Ho Cheong, Daejeon (KR); Hyoung Jin Kwon, Irvine, CA (US); Jae Seung Lee, Daejeon (KR); Jae Woo Park, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/706,159

(22) Filed: Sep. 15, 2017

(65) Prior Publication Data
US 2018/0098310 A1    Apr. 5, 2018

Related U.S. Application Data

(63) Continuation of application No. 14/438,184, filed as application No. PCT/KR2013/009530 on Oct. 24, 2013, now Pat. No. 9,794,929.
(Continued)

(30) Foreign Application Priority Data

Oct. 24, 2012  (KR) .................... 10-2012-0118327
Oct. 24, 2013  (KR) .................... 10-2013-0127273

(51) Int. Cl.
*H04W 72/04* (2009.01)
*H04W 56/00* (2009.01)
(Continued)

(52) U.S. Cl.
CPC ..... *H04W 72/044* (2013.01); *H04W 56/0015* (2013.01); *H04W 74/006* (2013.01); *H04W 84/12* (2013.01)

(58) Field of Classification Search
CPC ............................ H04W 48/02; H04W 74/006
See application file for complete search history.

(56) References Cited

U.S. PATENT DOCUMENTS

2008/0159327 A1   7/2008  Pernu
2013/0229996 A1*  9/2013  Wang ................ H04W 72/0413
                                                    370/329

FOREIGN PATENT DOCUMENTS

KR       10-0479865 B1    3/2005
KR    10-2006-0057459 A   5/2006
(Continued)

OTHER PUBLICATIONS

International Search Report for PCT/KR2013/009530 filed on Oct. 24, 2013.

*Primary Examiner* — Pao Sinkantarakorn

(57) ABSTRACT

Provided is a method and apparatus for allocating resources in a wireless local area network (WLAN) system, the method including determining a restricted access bandwidth (RAB) interval based on at least a bandwidth or a partial bandwidth among a plurality of bandwidths, and setting a restricted access window (RAW) of a time domain based on the RAB interval.

7 Claims, 11 Drawing Sheets

Related U.S. Application Data

(60) Provisional application No. 61/746,072, filed on Dec. 26, 2012.

(51) Int. Cl.
  *H04W 84/12* (2009.01)
  *H04W 74/00* (2009.01)

(56) References Cited

FOREIGN PATENT DOCUMENTS

| KR | 10-1391328 B1 | 5/2014 |
|---|---|---|
| WO | WO 2011/038780 A1 | 4/2011 |
| WO | WO 2011/100540 A8 | 8/2011 |

* cited by examiner

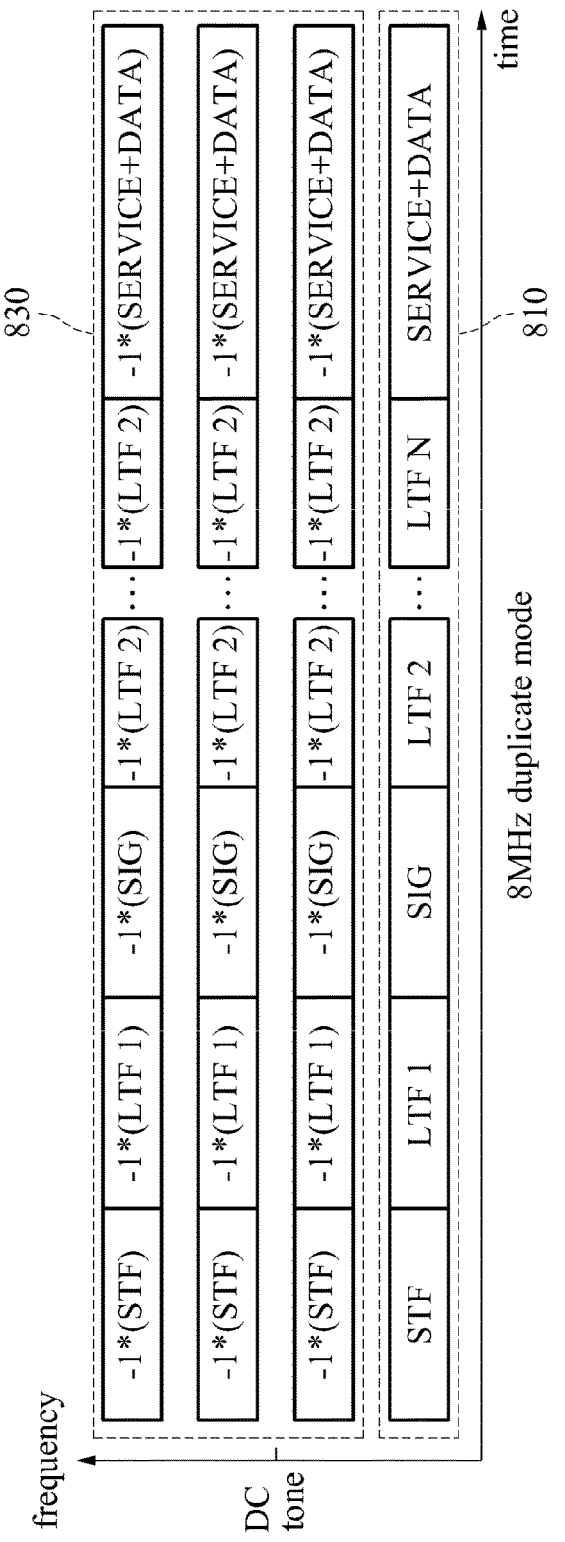

METHOD AND DEVICE FOR ALLOCATING RESOURCE IN WIRELESS LAN SYSTEM, COMMUNICATION TERMINAL METHOD AND COMMUNICATION TERMINAL

CROSS-REFERENCE TO RELATED APPLICATIONS

This application is a continuation of U.S. patent application Ser. No. 14/438,184, filed Apr. 23, 2015, which is a U.S. National Stage of International Patent Application No. PCT/KR2013/009530, filed Oct. 24, 2013, which claims priority to and the benefit of Provisional Application No. 61/746,072, filed Dec. 26, 2012, Korean Patent Application No. 10-2012-0118327, filed Oct. 24, 2012, and Korean Patent Application No. 10-2013-0127273, filed Oct. 24, 2013, the entire contents of which are incorporated herein by reference.

TECHNICAL FIELD

The present invention relates to a wireless local area network (WLAN) system and more particularly, a method and apparatus for allocating resources in the WLAN system.

BACKGROUND ART

In general, development of wireless local area network (WLAN) technology has advanced in three directions.

One direction indicates technology for improving a transmission rate and includes WLAN technology using a 60 gigahertz (GHz) band and WLAN technology using a 5 GHz band. Another direction indicates wideband WLAN technology using a frequency band under 1 GHz to extend coverage when compared to conventional WLAN technology, and still another direction indicates technology for reducing link set-up time of a WLAN system.

Wideband WLAN technology is required to accommodate a remarkably larger number of stations (STAs) than established WLAN technology.

Further, the wideband WLAN technology may need to support STAs with various types of services, such as, offloading terminals and sensor terminals, traffic types, and power saving demands.

Therefore, advancements are being made in a wideband WLAN system for reducing collisions in channel access and achieving efficient power saving by grouping a plurality of STAs. Also, advancements are being made in the wideband WLAN system for using restricted resources such as a bandwidth, a time, and a power.

DISCLOSURE OF INVENTION

Technical Solutions

According to an aspect of the present invention, there is provided a resource allocation method in a wireless local area network (WLAN) system, the method including determining a restricted access bandwidth (RAB) interval based on at least a bandwidth or a partial bandwidth among a plurality of bandwidths, and setting a restricted access window (RAW) of a time domain based on the RAB interval.

The resource allocation method may further include inspecting a state of a basic service set (BSS) including an access point (AP) and at least one STA.

The resource allocation method may further include transmitting, to an STA, information associated with the RAB interval and information associated with the RAW.

According to another aspect of the present invention, there is also provided a communication method in a WLAN system, the method including receiving information associated with an RAB interval and information associated with an RAW, determining whether communication is available in a frequency domain determined based on the RAB interval, and transmitting, when communication is available in the frequency domain, data in a time domain determined based on the RAW.

According to still another aspect of the present invention, there is also provided a resource allocation apparatus including an RAB interval determiner to determine an RAB interval based on at least a bandwidth or a partial bandwidth among a plurality of bandwidths, and an RAW setting unit to set an RAW of a time domain based on the RAB interval.

The resource allocation apparatus may further include a state inspector to inspect a state of a BSS including an AP and at least one STA.

The resource allocation apparatus may further include a communicator to transmit, to an STA, information associated with the RAB interval and information associated with the RAW.

According to yet another aspect of the present invention, there is also provided a communication terminal including a communicator to receive information associated with an RAB interval and information associated with an RAW, and a controller to determine whether communication is available in a frequency domain determined based on the RAB interval, wherein the communicator transmits, when communication is available in the frequency domain, data in a time domain determined based on the RAW.

Advantageous Effects

According to an aspect of the present invention, flexible usage of a frequency in temporally grouped windows is possible. As such, a transmission rate and performance in a wireless local area network (WLAN) system is improved without an additional effort.

BRIEF DESCRIPTION OF DRAWINGS

FIGS. 8A and 8B are diagrams illustrating examples of a configuration of a duplication mode frame according to another example embodiment.

BEST MODE FOR CARRYING OUT THE INVENTION

Figure 1:
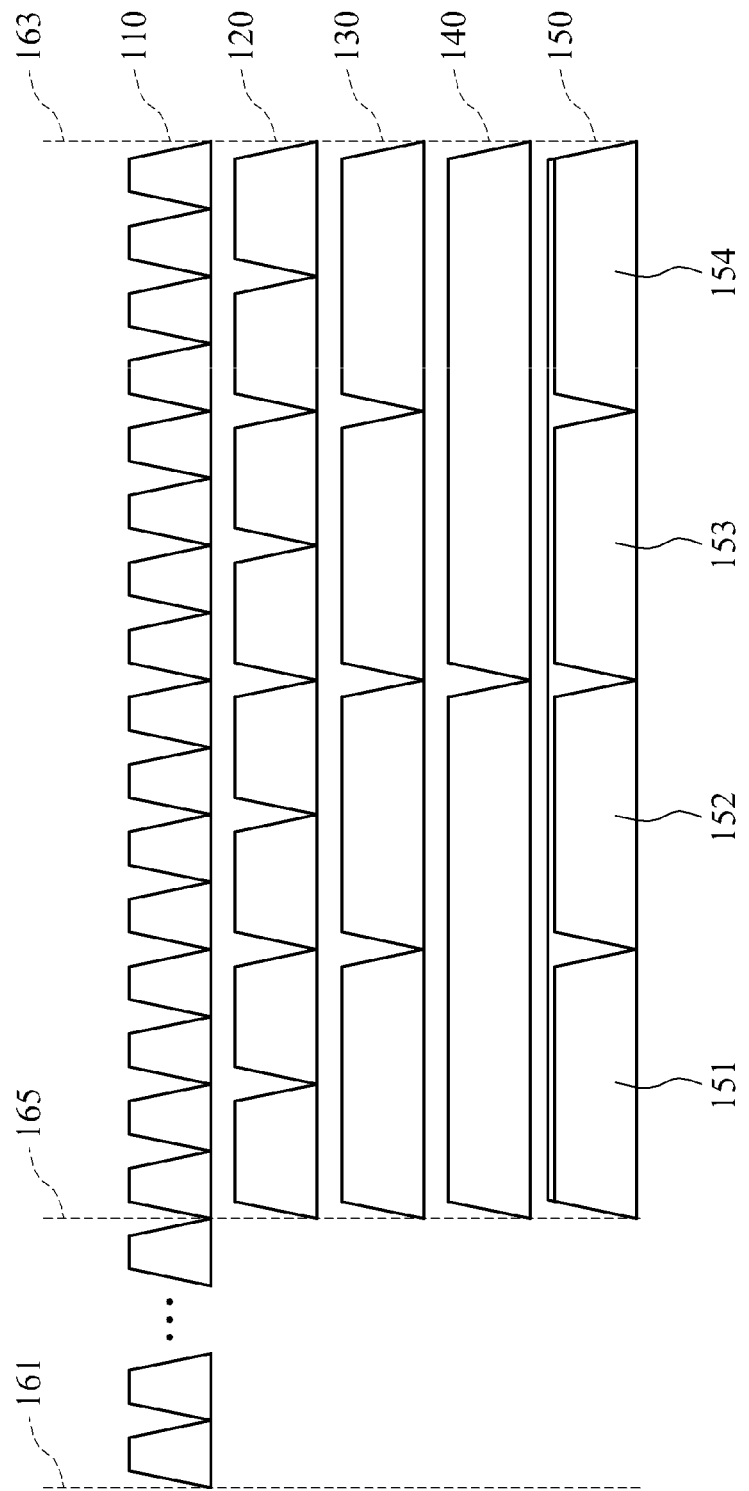
FIG. 1 is a diagram illustrating a multi-bandwidth in a wideband wireless local area network (WLAN) system according to an example embodiment.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes specific details in order to provide a thorough understanding of the present invention. However, it will be apparent to those skilled in the art that the present invention may be practiced without such specific details.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Specific terminologies hereinafter used in the embodiments of the present invention are provided to assist understanding of the present invention, and various modifications may be made in the specific terminologies within the range that they do not depart from technical spirits of the present invention.

In some instances, known structures and devices are omitted or are shown in block diagram form, focusing on important features of the structures and devices, so as not to obscure the concept of the invention. The same reference numbers will be used throughout this specification to refer to the same or like parts.

The embodiments of the present invention may be supported by standard documents disclosed in at least one of wireless access systems, i.e., an Institute of Electrical and Electronics Engineers (IEEE) 802 system, a third generation partnership project (3GPP) system, a 3GPP long term evolution (LTE) system, an LTE-Advanced system, and a 3GPP2 system. Namely, among the embodiments of the present invention, steps or parts which are not described to clarify the technical features of the present invention may be supported by the above standard documents. Also, all terminologies disclosed herein may be described by the above standard documents.

The following technology may be used for various wireless access systems such as code division multiple access (CDMA), frequency division multiple access (FDMA), time division multiple access (TDMA), orthogonal frequency division multiple access (OFDMA), and single carrier frequency division multiple access (SC-FDMA). The CDMA may be implemented by the radio technology such as universal terrestrial radio access (UTRA) or CDMA 2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802-20, and evolved UTRA (E-UTRA). Although the following description will be based on the IEEE 802.11 system to clarify description of technical features, it is to be understood that technical spirits of the present invention are not limited to the IEEE 802.11 system.

FIG. 1 is a diagram illustrating a multi-bandwidth in a wideband WLAN system according to an example embodiment.

A wideband WLAN system, for example, a WLAN system defined in the IEEE 802.11ah standard, may support a multi-bandwidth. The multi-bandwidth may include a first bandwidth having the lowest signal-to-noise ratio (SNR) and a second bandwidth that is two times greater than the first bandwidth. In this instance, a value of the first bandwidth may be 1 megahertz (MHz).

Referring to FIG. 1, the multi-bandwidth may include a bandwidth of 1 MHz110, a bandwidth of 2 MHz 120, a bandwidth of 4 MHz 130, a bandwidth of 8 MHz 140, and a bandwidth of 16 MHz 150. A frequency band of the wideband WLAN system may be less than or equal to 1 gigahertz (GHz).

Accordingly, "the multi-bandwidth may be expressed to include 1 MHz, 2 MHz, 4 MHz, 8 MHz, and 16 MHz".

For example, in FIG. 1, a frequency lower limit value 161 may be a value between 700 MHz and 920 MHz, and a frequency upper limit value 163 may be a value between 750 MHz and 930 MHz. As illustrated in FIG. 1, the bandwidth of 1 MHz 110 may be allocated throughout an entire channel, and remaining bandwidths, for example, the bandwidth of 2 MHz 120, the bandwidth of 4 MHz 130, the bandwidth of 8 MHz 140, and the bandwidth of 16 MHz 150may be allocated to only a portion of a section of the entire channel.

For example, the bandwidth of 16 MHz 150 may be allocated between a predetermined frequency value 165 of FIG. 1 and the frequency upper limit value 163. Referring to FIG. 1, eight channels are allocated to the bandwidth of 2 MHz 120, four channels are allocated to the bandwidth of 4 MHz 130, and two channels are allocated to the bandwidth of 8 MHz 140. However, allocation of channels as illustrated in FIG. 1 is provided only as an example and thus, a number of channels and a frequency band may be configured using a variety of methods.

In the present specification, a transmission mode having a value of the bandwidth of 1 MHz 110 may be referred to as a 1 MHz mode, and a transmission mode having a value of the bandwidth of 2 MHz 120 may be referred to as a 2 MHz mode. Also, transmission modes having values of the bandwidth of 4 MHz 130, the bandwidth of 8 MHz 140, and the bandwidth of 16 MHz 150 may be referred to as a 4 MHz mode, an 8 MHz mode, and a 16 MHz mode, respectively.

According to an example embodiment, the 1 MHz mode may indicate a transmission mode that maintains an orthogonal frequency division multiplexing (OFDM) symbol structure and includes 32 subcarriers. In this instance, the 1 MHz mode may use a frequency domain repetition transmission method and thus, may have the lowest transmission rate among bandwidths. In the 1 MHz mode, a signal may be transmitted to the farthest distance since the 1 MHz mode has a relatively low SNR.

Figure 2:
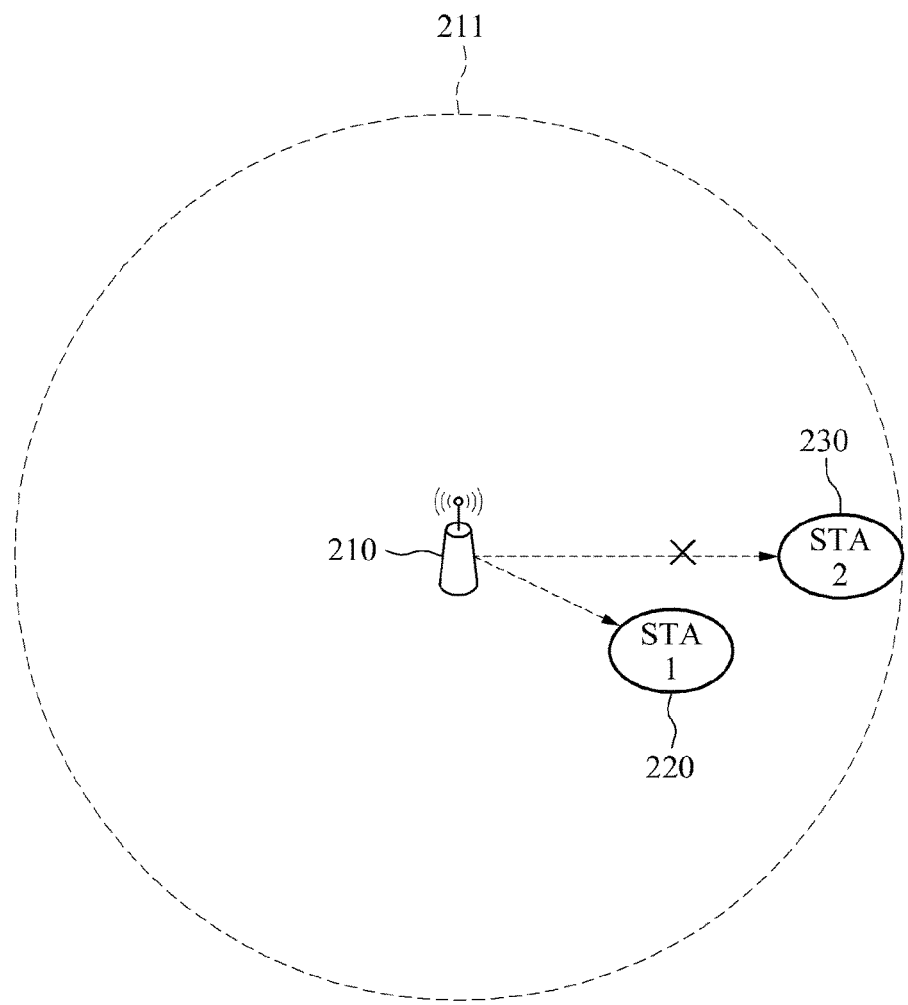
FIG. 2 is a diagram illustrating an example of a configuration of an Institute of Electrical and Electronics Engineers (IEEE) 802.11 system to which the present invention is applicable.

FIG. 2 is a diagram illustrating an example of a configuration of an IEEE 802.11 system to which the present invention is applicable.

The IEEE 802.11 system may include a basic service set (BSS) indicating a basic configuration block. Referring to FIG. 2, a station (STA)-1 220 and an STA-2 230 are described as BSS members. A communication apparatus 210 may be an access point (AP) or a base station (BS).

In FIG. 2, a dotted line circle 211 indicating the BSS may be understood to indicate a coverage area in which STAs or communication terminals included in a corresponding BSS maintains communications. The coverage area may be also referred to as a basic service area (BSA). When an STA is relocated to an external area of the BSA, the STA may be unable to communicate directly with other STAs included in the corresponding BSA.

The AP may correspond to, for example, a node-B, an evolved node-B (eNB), a base transceiver system (BTS), a femto BS, and a BS in a different wireless communication field.

A beacon frame corresponds to a management frame of the IEEE 802.11. The beacon frame may provide notification of a presence of a wireless network, and transmitted periodically so as to enable the STA performing a scanning to discover the wireless network and participate in the wireless network.

In the BSS, the AP may transmit the beacon frame periodically. When the STA performing a scan receives the beacon frame, the STA may store information associated with the BSS included in the beacon frame, move to another channel, and record beacon frame information in the other channel. The STA receiving the beacon frame may store information associated with the BSS included in the received beacon frame and move to a subsequent channel, thereby performing a scan in the subsequent channel in an identical pattern.

The STA-1 220 and the STA-2 230 may be terminals that receive, in full, a signal transmitted in a 1 MHz mode and a signal transmitted in a 2 MHz mode, thereby demodulating the received signals.

For example, when the communication apparatus 210 transmits a signal using the 2 MHz mode, the STA-1 220 may receive the signal and the STA-2 230 may not receive the signal.

The 1 MHz mode may have the longest signal transmission distance. Thus, when the communication apparatus 210 transmits a signal using the 1 MHz mode, the STA-2 230 may also receive the signal. Accordingly, both a duplication mode using the 2 MHz mode as a base bandwidth and a duplication mode using the 1 MHz mode as a base bandwidth may be required.

Figure 3:
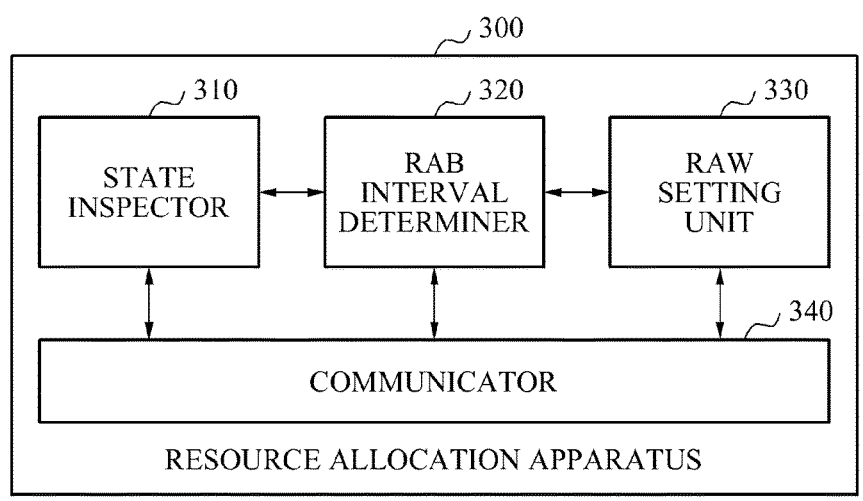
FIG. 3 is a diagram illustrating a configuration of a resource allocation apparatus in a WLAN system according to an example embodiment.

FIG. 3 is a diagram illustrating a configuration of a resource allocation apparatus 300 in a WLAN system according to an example embodiment.

Referring to FIG. 3, the resource allocation apparatus 300 may include a restricted access bandwidth (RAB) interval determiner 320 and a restricted access window (RAW) setting unit 330. The resource allocation apparatus 300 may also include a state inspector 310 and a communicator 340. According to an example embodiment, the resource allocation apparatus 300 may be included in an AP to operate.

The state inspector 310 may inspect a state of a BSS including the AP and at least one STA. For example, the state inspector 310 may inspect an overlapping basic service set (OBSS) vulnerable state such as a periodic mute interval. A state in which predetermined bandwidth modes are available may be affected by an OBSS only, aside from a case of a non-traffic indication map (TIM). The state inspector 310 may provide information associated with a state of the OBSS to the RAB interval determiner 320. In a WLAN system, the STA may recognize whether data to be transmitted to the STA is present based on a TIM element.

The RAB interval determiner 320 may determine an RAB interval based on a bandwidth or a partial bandwidth among a plurality of bandwidths. The RAB interval may indicate a restricted access zone on a frequency axis. A frequency domain to which the STA is allowed access may be determined based on the RAB interval. For example, only a data transmission less than or equal to a set RAB may be allowed, or only a data transmission greater than or equal to the set bandwidth may be allowed.

The RAB interval determiner 320 may determine the RAB interval based on the information associated with the state of the OBSS provided by the state inspector 310. The RAB interval determiner 320 may determine a bandwidth or a partial bandwidth among a plurality of bandwidths based on a state of the BSS. The RAB interval determiner 320 may determine the RAB interval based on the determined bandwidth or the determined partial bandwidth. For example, the RAB interval determiner 320 may determine a predetermined bandwidth or a predetermined partial bandwidth, for example, a third 4 MHz BW from a left in a 16 MHz BSS operation, which is determined to be clear, based on the information associated with the state of the OBSS.

The RAB interval determiner 320 may periodically set a mute interval to measure interference from the OBSS, thereby identifying an available bandwidth. To this end, an intended bandwidth plan may be set for all STAs based on a transmission plan in a downlink (DL) transmission. Accordingly, a determination as to whether overlap is allowed may be necessary at each slot.

The RAW setting unit 330 may set an RAW of a time domain based on the RAB interval determined by the RAB interval determiner 320. The RAW may indicate a restricted access interval on a time axis and also indicate a predetermined time interval in which predetermined STAs are allowed access. The RAW may determine the time domain in which the STA is allowed access. Access trials of the STAs may be distributed by setting the RAW on the time axis.

The RAW setting unit 330 may set the RAW in the RAB interval and thus, control the STA to access in a predetermined time interval with respect to a data transmission with a predetermined bandwidth. For example, since the RAW is set to the RAB interval, only a data transmission either less than or equal to, or greater than or equal to the set bandwidth may be allowed to enter a time interval of the RAW. Thus, a frequency resource use rate may be improved in view of an overall BSS.

As an example, when the BSS is based on an 8 MHz mode, the RAB interval determiner 320 may set a frequency interval of "4 MHz or more" on the frequency axis, and allow entry of a data transmission of right 4 MHz, left 4 MHz or 8 MHz. In this instance, the RAW setting unit 330 may set the RAW with respect to the RAB interval determined on the frequency axis, and allow the entry of the data transmission of right 4 MHz, left 4 MHz or 8 MHz in a time interval corresponding to the set RAW.

As another example, when the BSS is based on a 16 MHz mode, the RAB interval determiner 320 may set a frequency interval of "2 MHz or less" on the frequency axis, and allow entry of a data transmission of 2 MHz or 1 MHz. In this instance, the RAW setting unit 330 may set the RAW with respect to the RAB interval determined on the frequency axis, and allow the entry of the data transmission of 2 MHz or 2 MHz in a time interval corresponding to the set RAW.

The RAW setting unit 330 may set a priority of the RAW based on a bandwidth used by the STA. The RAW setting unit 330 may group the STAs based on the priority set for the RAW and assign the grouped STAs. The RAW setting unit 330 may set the RAW with respect to each of the STAs in a beacon interval based on the priority of the RAW. The RAW setting unit 330 may set the RAW with respect to each of the STAs such that STAs using a relatively large bandwidth may be temporally prioritized in the beacon interval.

The communicator 340 may transmit, to the STA, information associated with the RAB interval and information associated with the RAW. When the communicator 340 transmits data to the STA in DL data delivery, data may be aligned on a slot-by-slot basis. The communicator 340 may perform a plurality of bandwidth transmissions concurrently without overlapping on the frequency axis. The communicator 340 may perform a multi-channel transmission on slot-by-slot basis, thereby improving frequency efficiency.

For each instance in which a slot is initiated, the communicator 340 may transmit, to the STA, the information associated with the RAB interval using a duplication mode frame or a synchronized (sync) frame. The communicator 340 may provide notification of a frequency range available for a corresponding slot in the duplicated form of a frame by broadcasting. Alternatively, the communicator 340 may supply a corresponding function to the sync frame. For example, the communicator 340 may store the information associated with the RAB interval or information associated with the frequency range available for the corresponding slot in a scrambling seed or a basic unit of signal (SIG) field in the duplication mode frame, thereby transmitting the stored information to the STA.

For effective control of a request to send (RTS)/clear to send (CTS) in a slot or the RAW, a process of identifying a slot-based or an RAW-based available frequency range may be performed in advance through a sequence exchange of RTS (AP)=>CTS (from a representative STA or allocated STAs).

Irrespective of whether the RTS/CTS is performed based on a slot or the RTS/CTS is performed between links, a process of decreasing may be conducted in a bandwidth of each of the links based on a previously intended plan. Thus, an occurrence of overlapping between the BWs to be used, caused by an RTS/CTS exchange, may be prevented.

In a case of an 8 MHz transmission including a primary 1 MHz, a primary/secondary channel allocation scheme of 802.11 ac, which inflexibly determines a primary 1 MHz, a primary 2 MHz, and a primary 4 MHz, may need to be flexible such that, for example, the DL transmission with a secondary 40 MHz is allowed to be performed on a predetermined STA.

When a response to an instantaneous change in an OBSS vulnerable state is required, the resource allocation apparatus 300 may enable the RAB interval to be initiated at every point in time during a beacon interval and separate indication information, for example, a list of corresponding STAs may be provided at a start time. For a case in which the OBSS vulnerable state changes infrequently, providing notification to a beacon may be necessary. The bandwidth to be used may be changed to another, based on an unexpected instantaneous state. In this instance, relocating to an unscheduled time interval assigned to another bandwidth is required.

Figure 4:
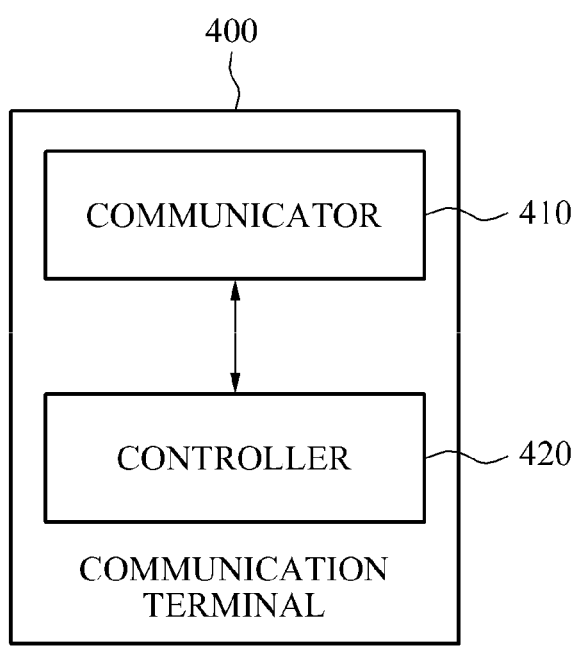
FIG. 4 is a diagram illustrating a configuration of a communication terminal in a WLAN system according to an example embodiment.

FIG. 4 is a diagram illustrating a configuration of a communication terminal 400 in a WLAN system according to an example embodiment.

Referring to FIG. 4, the communication terminal 400 may include a communicator 410 and a controller 420.

The communicator 410 may receive information associated with an RAB interval and information associated with an RAW from an AP. A frequency domain in which a data transmission is allowed may be determined based on the RAB interval. The RAW may indicate a time domain in which the data transmission is allowed.

For example, the communicator 410 may extract the information associated with the RAB interval from a synch frame or a duplication mode frame received from the AP at each instance a slot is initiated. The communicator 410 may extract the information associated with the RAB interval or information associated with an available frequency range from a scrambling seed or a basic unit of SIG field in a duplication mode frame.

The controller 420 may determine, based on the RAB interval, the frequency domain allowing an access, and determine whether communication is available in the determined frequency domain. The RAB interval may be provided in a form of a bandwidth or a partial bandwidth. The RAB interval may determine the frequency domain in which a data transmission is allowed. For example, only a data transmission less than or equal to a set RAB may be allowed, or only a data transmission greater than or equal to the set RAB may be allowed.

When communication is available in the frequency domain determined based on the RAB interval, the communicator 410 may transmit data in the time domain determined based on the RAW. The RAW may indicate the time domain in which the data transmission is allowed. The frequency domain determined based on the RAB interval may correspond to one of a frequency domain less than or equal to a bandwidth set based on the RAB and a frequency domain greater than or equal to the bandwidth set based on the RAB. Based on the RAB interval and the RAW, the communicator may transmit the data in a predetermined bandwidth and a predetermined time domain. For example, a data transmission either less than or equal to, or greater than or equal to the bandwidth set based on the RAB interval may be performed in the time domain determined based on the RAW.

Figure 5:
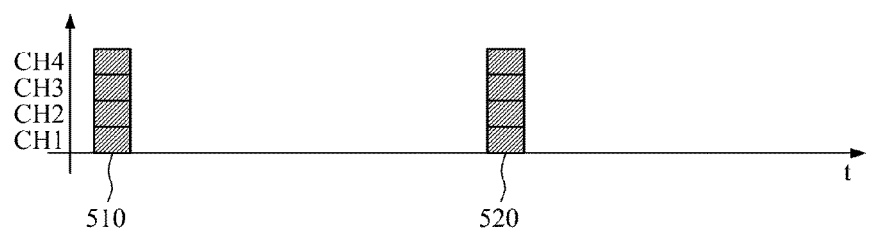
FIGS. 5 and 6 are diagrams illustrating examples of a resource allocation method according to an example embodiment.
Figure 6:
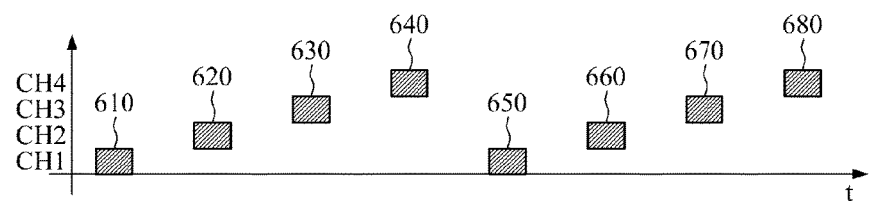

FIGS. 5 and 6 are diagrams illustrating examples of a resource allocation method according to an example embodiment.

Referring to FIG. 5, an RAW is set in a WLAN system in lieu of an RAB interval. Accordingly, STAs or communication terminals may transmit data in predetermined time intervals 510, and 520 determined based on the RAW irrespective of a bandwidth or a channel to be used.

Referring to FIG. 6, in a WLAN system, an RAB interval is determined with respect to each STA, and an RAW is set based on the determined RAB interval. Each STA may transmit data in a time domain determined based on the RAW in a bandwidth or a channel allocated to the STA.

For example, an STA 1 may transmit data in a time domain of a time interval 1 610 in a frequency domain of a channel (CH) 1. An STA 2 may transmit data in a time domain of a time interval 2 620 in a frequency domain of a CH 2. An STA 3 may transmit data in a time domain of a time interval 3 630 in a frequency domain of a CH 3. An STA 4 may transmit data in a time domain of a time interval 640 in a frequency domain of a CH 4. Subsequently, the STA 1, the STA 2, the STA 3, and the STA 4 may transmit data in time domains of time intervals 650, 660, 670, and 680 in CHs in an identical pattern, respectively.

Figure 7A:
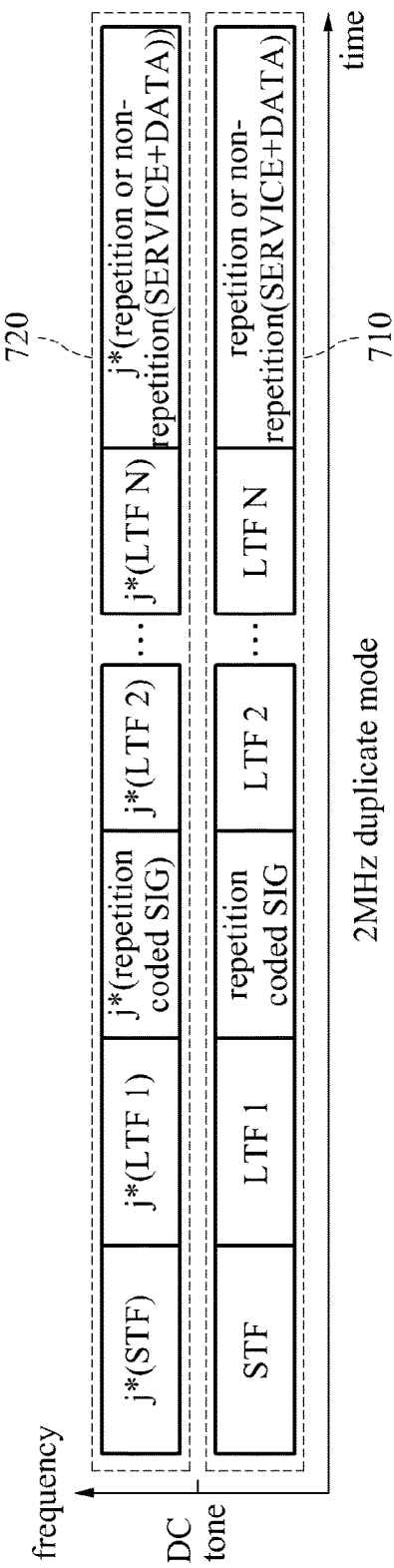
FIGS. 7A and 7B are diagrams illustrating examples of a configuration of a duplication mode frame according to an example embodiment.
Figure 7B:
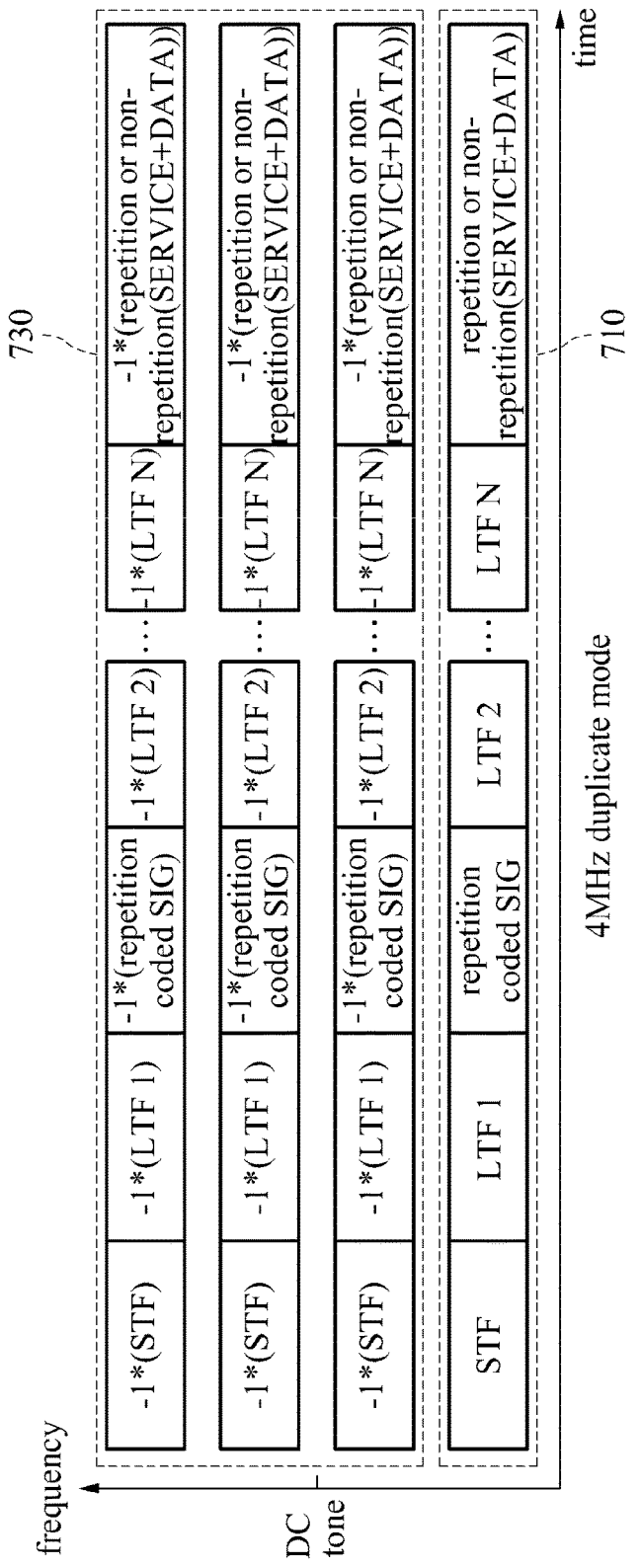

FIGS. 7A and 7B are diagrams illustrating examples of configuring a duplication mode frame according to an example embodiment.

FIG. 7A illustrates a 2 MHz duplication mode frame.

In this instance, the 2 MHz duplication mode frame may include a basic frame 710 and a duplication frame 720 having a phase different from a phase of the basic frame 710 by 90 degrees (°). Referring to FIG. 7A, a duplication mode frame transmission may include an operation of transmitting a frame and then shifting a phase of the same frame by 90° based on a DC tone and transmitting the phase-shifted frame, through two bandwidths, respectively.

For example, a process of transmitting the duplication mode frame may include an operation of transmitting a basic frame through a third band while simultaneously transmitting a duplication frame through a fourth band.

Accordingly, a receiver receiving a duplication mode frame may perform demodulation by receiving a frame received from any one of the third band and the fourth band.

The basic frame 710 of FIG. 7A may be provided in a same structure as a structure of the 1 MHz mode frame. The basic frame 710 may include a short training field (STF), a long training field (LTF), and a SIG field.

The SIG field of the 1 MHz mode frame may be provided in a structure in which information associated with a bandwidth is omitted.

When the duplication mode frame is configured based on a bandwidth of 1 MHz, inserting information defining a bandwidth may be required. For example, bandwidth information may be inserted using a portion of bits among four bits defined as a reserved bit in an SIG. In this instance, the bandwidth information may refer to information associated with a bandwidth of a frequency axis used in the example of FIG. 7A. Also, the bandwidth information may be defined using a portion of lower bits of a scrambler sheet included in a service field.

Three bits may be required to divide a bandwidth into 1 MHz, 2 MHz, 4 MHz, 8 MHz, and 16 MHz and subsequently identify the divided bandwidths.

Accordingly, a frame structure of a first bandwidth may be provided in a structure in which information associated with a multi-bandwidth is omitted, and a basic frame generated based on the first bandwidth may include information associated with the multi-bandwidth in a SIG field or a service field.

FIG. 7B illustrates a 4 MHz duplication mode frame.

The 4 MHz duplication mode frame may include a basic frame 710 and three duplication frames having phases different from a phase of the basic frame 710 by 180°.

As illustrated in FIG. 6, a null data packet (NDP) type short CTS message may be generated using a bandwidth of 1 MHz as a basic unit. In this instance, the NDP type short CTS message may be provided in a form of FIG. 7B excluding fields subsequent to an LTF 2.

Figure 8A:
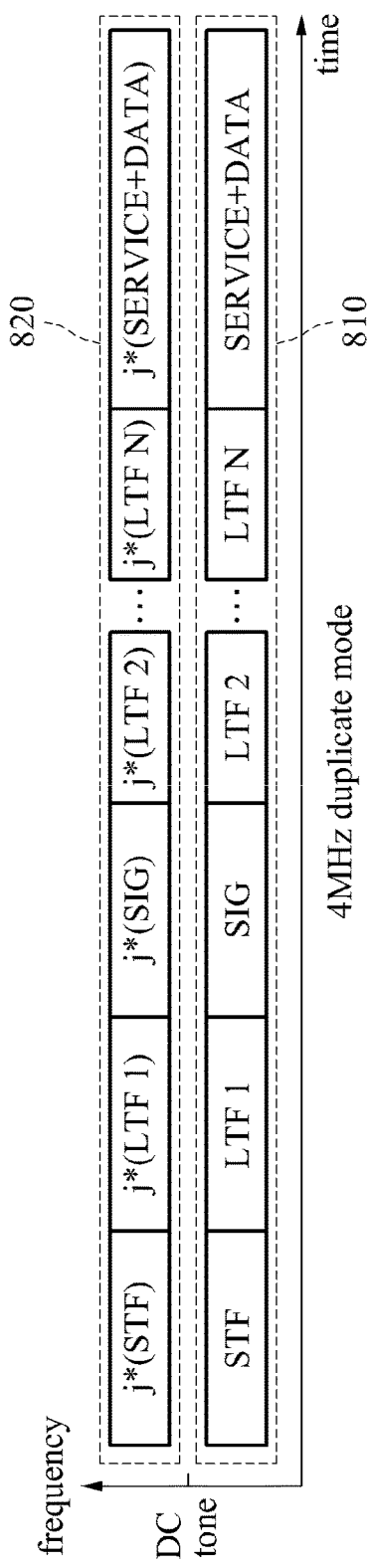

FIGS. 8A and 8B are diagrams illustrating examples of configuring a duplication mode frame according to another example embodiment.

FIG. 8A illustrates a 4 MHz duplication mode frame.

In this instance, the 4 MHz duplication mode frame may include a basic frame 810 and a duplication frame 820 having a phase different from a phase of the basic frame 810 by 90°. Referring to FIG. 8A, transmission of a duplication mode frame may be performed by transmitting a frame and then shifting a phase of the same frame by 90° based on a (DC) tone and transmitting the phase-shifted frame, through two bands, respectively.

For example, a process of transmitting the duplication mode frame may include an operation of transmitting a basic frame through a first band and simultaneously transmitting a duplication frame through a second band.

Accordingly, a reception end receiving a duplication mode frame may perform demodulation by receiving a frame received from any one of the first band and the second band.

As illustrated in FIG. 8A, the basic frame 810 may be provided in an identical structure to a structure of the 2 MHz mode frame. The basic frame 810 may include an STF, an LTF, and an SIG field.

FIG. 8B illustrates an 8 MHz duplication mode frame.

The 8 MHz duplication mode frame may include a basic frame 810 and three duplication frames 830 having a phase different from a phase of the basic frame 810 by 180°.

Four frames included in the 8 MHz duplication mode frame may be simultaneously transmitted through four separate bandwidths.

Accordingly, a reception end receiving a duplication mode frame may perform demodulation or detection although only one frame is received among the aforementioned four frames.

Although not shown in FIG. 8B, a 16 MHz duplication mode frame may be provided in a structure in which the 8 MHz duplication mode frame is repeated twice on a frequency axis.

The structure of the duplication mode frame illustrated in FIGS. 8A and 8B may be used to transmit an RTS message and an "NDP type short CTS message" in which a data portion is not included.

Figure 9:
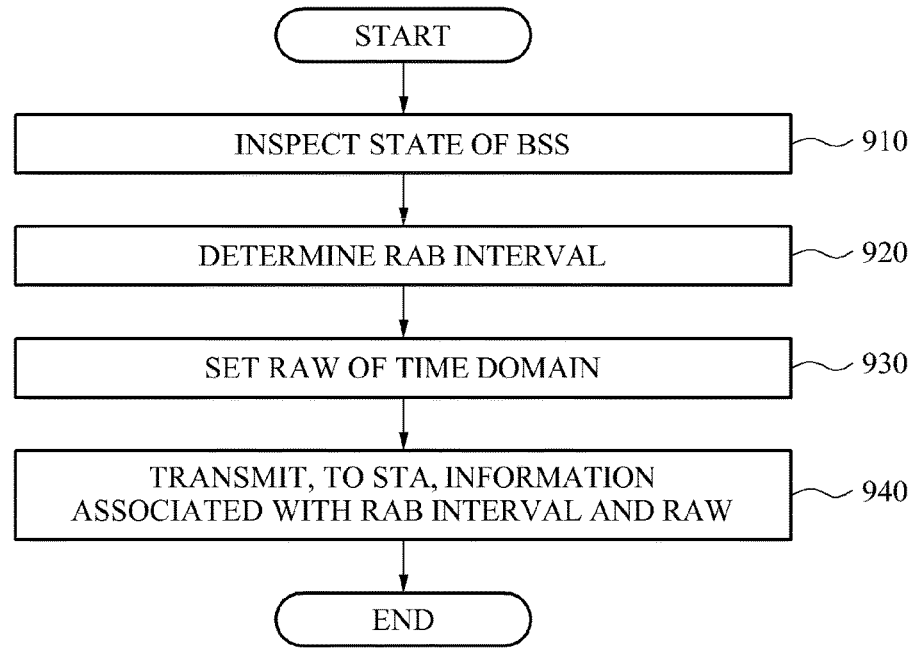
FIG. 9 is a flowchart illustrating an operation of a resource allocation method in a WLAN system according to an example embodiment.

FIG. 9 is a flowchart illustrating an operation of a resource allocation method in a WLAN system according to an example embodiment.

In operation 910, a resource allocation apparatus may inspect a state of a BSS including an AP and at least one STA. For example, the resource allocation apparatus may inspect an OBSS vulnerable state such as a periodical mute interval.

In operation 920, the resource allocation apparatus may determine an RAB interval based on a bandwidth or a partial bandwidth among a plurality of bandwidths. The RAB interval may indicate a restricted access interval on a frequency axis. A frequency domain to which the STA is allowed access may be determined based on the RAB interval. For example, only a data transmission less than or equal to a set RAB may be allowed, or only a data transmission greater than or equal to the set bandwidth may be allowed.

The resource allocation apparatus may determine the RAB interval based on the information associated with a state of the OBSS. The resource allocation apparatus may determine a bandwidth or a partial bandwidth among a plurality of bandwidths based on a state of the BSS. The resource allocation apparatus may determine the RAB interval based on the determined bandwidth or the determined partial bandwidth. The resource allocation apparatus may periodically set a mute interval to measure interference from the OBSS, thereby identifying an available bandwidth.

In operation 930, the resource allocation apparatus may set an RAW of a time domain based on the determined RAB interval. The RAW may indicate a restricted access interval on a time axis and also indicate a predetermined time interval in which predetermined STAs are allowed access. The RAW may determine the time domain in which the STA is allowed access.

The resource allocation apparatus may set the RAW in the RAB interval and thus, control the STA to access in a predetermined time interval with respect to a data transmission with a predetermined bandwidth. For example, since the RAW is set to the RAB interval, only a data transmission either less than or equal to, or greater than or equal to the set bandwidth may be allowed to enter a time interval of the RAW. Thus, a frequency resource use rate may be improved in view of an overall BSS.

The resource allocation apparatus may set a priority of the RAW based on a bandwidth used by the STA. The resource allocation apparatus may group the STAs based on the priority of the RAW and assign the grouped STAs. The resource allocation apparatus may set the RAW with respect to each of the STAs such that STAs using a relatively large bandwidth may be temporally prioritized in the beacon interval.

In operation 940, the resource allocation apparatus may transmit information associated with the RAB interval and information associated with the RAW to the STA. When the resource allocation apparatus transmits data to the STA in DL data delivery, data may be aligned on a slot-by-slot basis. The resource allocation apparatus may perform a plurality of bandwidth transmissions concurrently without overlap on the frequency axis. For each instance at which a slot is initiated, the resource allocation apparatus may transmit, to the STA, the information associated with the RAB interval using a duplication mode frame or a sync frame. The resource allocation apparatus may store information associated with an available frequency range in a scrambling seed or a basic unit of SIG field in the duplication mode frame.

Figure 10:
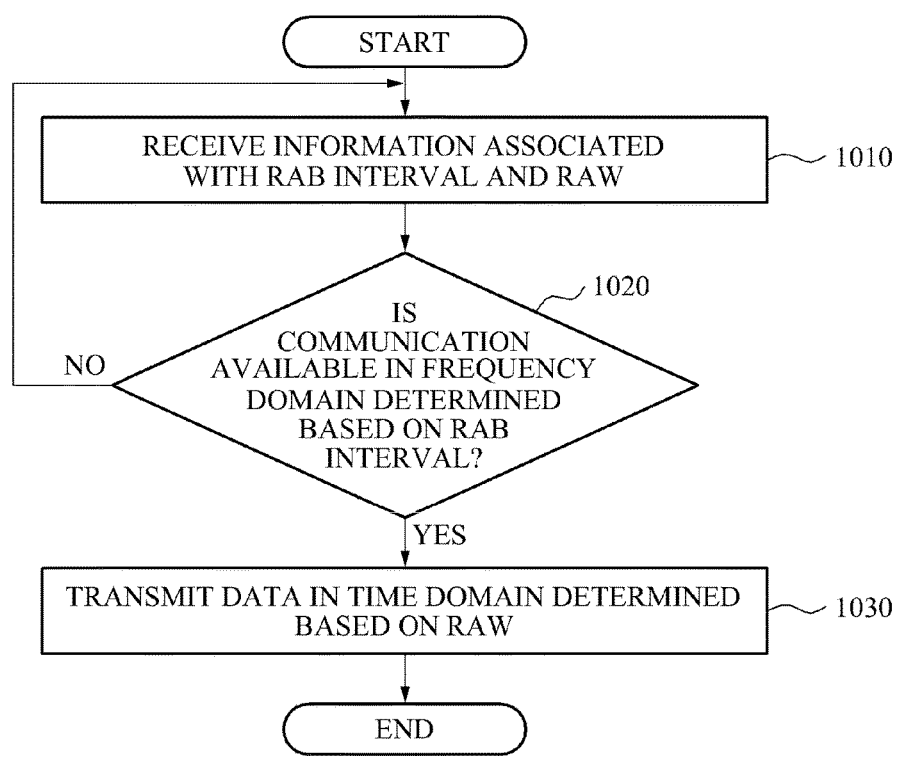
FIG. 10 is a flowchart illustrating an operation of a communication method in a WLAN system according to an example embodiment.

FIG. 10 is a flowchart illustrating an operation of a communication method in a WLAN system according to an example embodiment.

In operation 1010, a communication terminal may receive information associated with an RAB interval and information associated with an RAW from an AP. A frequency domain in which a data transmission is allowed may be determined based on the RAB interval. The RAW may indicate a time domain in which the data transmission is allowed. The communication terminal may extract the information associated with the RAB interval from a synch frame or a duplication mode frame received from the AP at each instance of a slot initiation.

In operation 1020, the communication terminal may determine the frequency domain allowing an access, based on the RAB interval, and determine whether communication is available in the determined frequency domain.

In operation 1030, when communication is available in the frequency domain determined based on the RAB interval, the communication terminal may transmit data in the time domain determined based on the RAW. The frequency domain determined based on the RAB interval may correspond to one of a frequency domain less than or equal to a bandwidth set based on the RAB and a frequency domain greater than or equal to the bandwidth set based on the RAB. Based on the RAB interval and the RAW, the communication terminal may transmit the data in a predetermined bandwidth and a predetermined time domain.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for supporting channel access by an access point (AP), the method comprising:
generating an information element indicating a set of channels and times allowed for channel access; and
transmitting a beacon frame including the information element,
wherein a first subset of channels among the set of channels indicated by the information element is allowed for channel access during a first time period,
wherein a second subset of channels among the set of channels indicated by the information element is allowed for channel access during a second time period, and
wherein the first time period does not overlap with the second time period.

2. The method according to claim 1,
wherein a first station (STA) is allowed to operate on the first subset of channels during the first time period, and a second STA is allowed to operate on the second subset of channels during the second time period.

3. The method according to claim 1,
wherein the first subset of channels is different from the second subset of channels.

4. The method according to claim 1,
wherein at least one of the first subset of channels or the second subset of channels does not include a primary channel for a basic service set (BSS) operated by the AP.

5. The method according to claim 1,
wherein at least one of the first time period or the second time period is set in a periodic manner.

6. A method for channel access by a station (STA), the method comprising:
receiving, from an access point (AP), a beacon frame including an information element, the information element indicating a set of channels and times allowed for channel access; and
transmitting or receiving on a subset of channels which is allowed for channel access during a time period indicated by the information element,
wherein a first subset of channels among the set of channels indicated by the information element is allowed for channel access during a first time period, wherein a second subset of channels among the set of channels indicated by the information element is allowed for channel access during a second time period, and wherein the first time period does not overlap with the second time period.

7. An apparatus of an access point (AP) for supporting channel access by an access point (AP), the apparatus comprising:

a transceiver; and a processor, wherein the processor is configured to:

generate an information element indicating a set of channels and times allowed for channel access; and cause the transceiver to transmit a beacon frame including the information element, wherein a first subset of channels among the set of channels indicated by the information element is allowed for channel access during a first time period, wherein a second subset of channels among the set of channels indicated by the information element is allowed for channel access during a second time period, and wherein the first time period does not overlap with the second time period.

* * * * *